106-83.
8-14-73

AU 116    EX
XR    3,752,696

United States Patent Office 3,752,696
Patented Aug. 14, 1973

3,752,696
COLORED ROOFING GRANULES
Romayne M. Beyard and John C. Horai, Hagerstown, Md., assignors to GAF Corporation, New York, N.Y.
No Drawing. Filed Feb. 17, 1967, Ser. No. 616,795
Int. Cl. B44d 1/20
U.S. Cl. 117—100 D                    9 Claims

ABSTRACT OF THE DISCLOSURE

Barium fluosilicate and other metal fluosilicates encapsulated by a polymeric composition such as polyvinyl chloride, that is substantially insoluble in water and alkali silicate at a temperature below about 100° F., but is capable of dissolving in hot alkali silicate binder, is used as a latent reactant in the process for manufacturing artificially colored roofing granules. The latent reactant is suspended in a pigmented aqueous silicate slurry which is used to coat mineral granules. The coated granules are heated to above 200° F. to cause insolubilization of the silicate by the chemical action of the fluosilicate.

BACKGROUND OF THE INVENTION

(I) Field of the invention

This invention relates to artificially colored roofing granules and, more particularly, to an improved process for applying colored coatings to mineral granules and to a pigmented aqueous silicate coating composition having suspended therein an encapsulated reactant.

(II) Description of the prior art

Two types of processes, low temperature and high temperature processes, are generally used for manufacturing artificially colored granules. These processes may be carried out batchwise or in a continuous manner. In carrying out the low temperature process, using a "batch" system, crushed, graded and preheated mineral granules are mixed with an aqueous silicate, a pigment and frequently a clay in a rotating barrel-type mixer until the granules are adequately covered. After or during such mixing, a chemical reactant, such as a fluoride, fluosilicate and fluoborate, is added thereto and distributed throughout the batch. The coated granules are dried, further dehydrated and insolubilized in a rotary kiln at a temperature below about 600° F.

Instead of adding the various components separately, it is advantageous to prepare initially a single aqueous slurry of alkali silicate coating composition having suspended therein the desired pigment. The slurry is then directly applied to the granules. In preparing the slurry, chemical reactants cannot be used, because they will cause premature gelling or coagulation of the silicate in the slurry and if used, the coating of the resultant fired granules will be weak and crumbly. Heretofore, in the low temperature process, a solution of an acidic pickling compound was applied to the hot granules to complete the insolubilization of the silicate coating. The use of a pickling compound increases the undesirable tendency of the resultant roofing granules to develop haze or to bloom, caused by the residual salts from the pickling compound.

The continuous low temperature process involves the concurrent flow of granules and a coating composition in the form of an aqueous alkali silicate slurry having suspended therein the suitable pigment and clay. The coated granules are continuously dried, dehydrated and partially insolubilized at a temperature below about 600° F.–700° F. Again, pickling solution is used for the insolubilization of the silicate coating.

In the high temperature process, the mineral base granules are similarly coated by mixing with an aqueous slurry of a pigment and sodium silicate. The slurry may also contain one or more passive water insoluble reactants, such as acid kaolin clay and cryolite. The coated granules are then dried, dehydrated and insolubilized in a rotary kiln at a temperature range from 800° F. to 1400° F. The high temperature process is limited to the use of coating compositions that contain heat stable pigments. It is not suitable, for example, for coating granules using phthalocyanine green or yellow iron oxide hydrated pigmented coating compositions, except when the yellow oxide is used as a pigment for red granules, since the heat metamorphosis effected by dehydration produces a red coating.

SUMMARY OF THE INVENTION

We have now found that a coating composition in the form of a slurry comprising an aqueous alkali silicate solution having suspended therein a pigment and an encapsulated chemical reactant, can be used advantageously in the manufacturing of artificially colored roofing granules. The invention is based on the discovery that active chemical compounds capable of insolubilizing the silicate binder when encapsulated with a suitable polymeric composition, which is substantially insoluble in an aqueous alkali silicate solution but is capable of dissolving in hot silicate binder, become substantially inert during the preparation of the slurry and the coating operation, but are highly reactive during the dehydration and insolubilization of the silicate binder. The encapsulated chemical reactant will not prematurely gel or coagulate the slurry but during the dehydration and insolubilization of the coated granules at elevated temperatures, will readily react with the silicate binder to form an insoluble matrix for the pigment.

Broadly stated, the process of this invention comprises coating mineral granules with a colored composition comprising an aqueous alkali silicate solution having suspended therein a pigment and an encapsulated chemical reactant in an amount sufficient to insolubilize the silicate. The encapsulating agent for the chemical reactant is a polymeric composition which is substantially insoluble in water and alkali silicate at a temperature below about 100° F., but is capable of dissolving in hot silicate binder above about 200° F. The thus coated granules are heated to a temperature above 200° F. to cause the dissolution of the polymeric composition, thereby allowing the reactant to insolubilize the silicate.

The process of this invention has a number of advantages which were not attained by the prior processes. The present invention uses a coating composition which has a highly desirable latent reactive material suspended therein. The latent reactive material in the silicate slurry will not cause the degradation of the film forming characteristics of the dehydrated slurry but it permits the use of low temperature for insolubilizing the silicate film in situ without the additional post pickling treatment with acid salts; hence it substantially reduces or eliminates the undesirable tendency for the thus coated granules to develop haze, to bloom or to form scum due to the salt residuals from the pickling process. We have also found that the process of this invention produces white granules with increased brightness.

DESCRIPTION OF THE PREFERRED EMBODIMENTS

The suitable chemical reactants for the process of this invention may be a number of existing reactive compounds used for insolubilizing alkali silicate. We prefer to use a metal fluosilicate, such as zinc, magnesium, sodium and particularly barium fluosilicate. Other chemical reactants that may be used include metal fluoborates.

The preferred encapsulating polymeric composition may be selected from a number of well-known materials, such as polymerized high molecular weight starch, polyvinyl chloride and silicone. These polymers are substantially water insoluble but are capable of dissolving in the hot aqueous silicate binder or releasing the reactive compound encapsulated therein as the granules are heated during the dehydration and insolubilization step of the process.

The amount of encapsulated reactants to be used in the preparation of the coating slurry varies with a number of variables, such as insolubilizing temperature, the encapsulating composition, the amount of silicate in the slurry, and the pigments. There does not appear to be any critical range and the amount used can be readily determined by one skilled in the art.

Suitable base granules can be selected from a wide class of relatively porous or non-porous and weather-resistant rock or mineral. Suitable minerals include trap rocks, slates, argillite, greystone, greenstone, quartz, quartzite, certain granites or certain synthetic granules made from clay or other ceramics, etc. In general, the preferred base granules are derived from relatively nonporous minerals.

In preparing artificially colored granules according to this invention, the natural mineral such as greenstone is crushed and screened to the desired size, generally to pass a "10 mesh" screen and to be retained on a "35 mesh" screen. The screened granules are initially heated to approximately 100–180° F. and then are mixed with an aqueous slurry containing a pigment, and sodium silicate in a tumbling barrel-type mixer. The amount of sodium silicate and pigment used may be varied depending on the grade of silicate and the pigment or pigments used.

The preferred grades of sodium silicate have a ratio of $Na_2O$ to $SiO_2$ of 1:2 to 1:3.25. A commercial example of a sodium silicate of this type is the "N" brand sodium silicate currently sold by the Philadelphia Quartz Company, which has a ratio of $Na_2O$ to $SiO_2$ of 1:3.22, a gravity of 41° Baumé and a solid content of 37–39 percent. The alkylinity of the silicate may be varied within the range stated above.

After the granules are thoroughly coated in the tumbling barrel mixer, they are pre-dried and then are fired in a rotary kiln at a suitable temperature above 200° F. but usually below about 600° F. A temperature as high as 1400° F. may also be used to substantially complete the dehydration and insolubilization of the silicate. Subsequent to firing, the granules are cooled to room temperature in a rotary type cooler. Sufficient water may be used to accelerate the cooling.

A specific example for manufacturing artificially colored mineral granules is described hereinbelow. In this example, the screened granules are first pre-heated to about 180° F. and then are mixed with a coating slurry prepared with 6 parts by weight of an "N" type sodium silicate (ratio of $Na_2O$ to $SiO_2$ is 1 to 3.25), 2 parts of water, 2 parts phthalocyanine green presscake, 4 parts of chromium oxide and 1 part of barium fluosilicate encapsulated with polyvinyl chloride. The coated granules are pre-dried and fired at a temperature of about 450° F. to susbtantially dehydrate and insolubilize the silicate in a rotary kiln. The exit temperature of the fired granules is approximately 400° F. The fired granules are cooled by water spray to approximately room temperature.

Granules so produced have low hot extraction alkalinities, satisfactory A.R.I.B. (Asphalt Roofing Institute Bureau) fixation and do not require post treatment with pickling compounds. We prefer, however, to treat the coated granules with a mineral oil, linseed oil or any other general treatment known to the roofing art. The hot extraction alkalinities of the granules were determined by the standard test method accepted by the industry. The test is designed to determine the amount of water solubles and acids or alkali present in the color coat. The A.R.I.B. fixation was also determined by standard test methods used in the industry. It is designed to determine the pigment fixation and color retention of the granules under severe conditions.

A second example illustrating a continuous process according to this invention for preparing white granules is described hereinbelow. In this example, the coating composition was initially prepared by mixing 1 part by weight of barium fluosilicate encapsulated with polyvinyl chloride, 8 parts water, 9 parts clay, 24 parts sodium silicate ("N" type) and 8 parts titanium dioxide. The resultant slurry was fed into a continuous coating apparatus concurrently with the graded mineral granules. The thus coated granules were dried and subsequently heated to above about 1000° F. Water spray was used to cool the insolubilized silicate coated granules. The cooled granules were treated with an oil.

The white granules produced in the second example were compared with similar granules prepared in a continuous process, using an identical coating composition with the exception that the encapsulated barium fluosilicate was replaced with a conventional passive reactant, cryolite. The comparisons were made using a Hunter Color Difference Meter. It was found that the granules prepared in the second example had increased brightness.

Furthermore, it was noted, that the use of cryolite (or other passive reactants) did not provide as satisfactory a permanent color film on low temperature granules as measured by the A.R.I.B. fixation test. Additional treatment with acid pickling compound must be used, which, as stated hereinabove, increases the tendency for the granules to develop haze and to bloom.

We claim:
1. A process for manufacturing artificially colored granules which comprises (a) coating mineral granules with a colored composition comprising a pigment, an aqueous alkali silicate and a reactant capable of insolubilizing said silicate at a temperature between about 200° F. to about 600° F. in an amount sufficient to react with and insolubilize said silicate, said reactant being encapsulated with a polymeric composition substantially insoluble in water and alkali silicate at a temperature below about 100° F. but capable of dissolving in said aqueous silicate above about 200° F. and (b) heating the thus coated granules to a temperature above 200° F. to cause the dissolution of said polymeric composition, thereby allowing the reactant to react with and insolubilize said silicate.

2. A process according to claim 1 wherein the reactant is a metal fluosilicate selected from the group consisting of barium, zinc, magnesium and sodium fluosilicates.

3. A process according to claim 1 wherein the encapsulating polymeric composition is polyvinyl chloride.

4. A process according to claim 1 wherein the encapsulating polymeric composition is a high molecular weight starch.

5. A process according to claim 1 wherein the reactant is barium fluosilicate encapsulated with polyvinyl chloride.

6. A process for manufacturing artificially colored granules which comprises (a) coating mineral granules with a colored composition comprising about 1 part of barium fluosilicate encapsulated with polyvinyl chloride, 8 parts of water, 9 parts of clay, 24 parts of sodium silicate and sufficient white pigment, and (b) heating the thus coated granules to a temperature above about 1000° F., said parts being parts by weight.

7. A process for manufacturing artificially colored granules which comprises (a) coating mineral granules with a colored composition comprising about 1 part of barium fluosilicate encapsulated with polyvinyl chloride, 6 parts of sodium silicate, 2 parts of water, 2 parts phthalocyanine green, and 4 parts chromium oxide and (b) heating the thus coated granules to a temperature above 200° F. but below about 450° F., said parts being parts by weight.

8. A process for manufacturing artificially colored granules which comprises:
   (a) coating mineral granules with a colored aqueous composition comprising water, pigment, an alkali silicate, and barium fluosilicate in an amount sufficient to react with and insolubilize said silicate, said barium fluosilicate being encapsulated with a polymeric composition substantially insoluble in water and alkali silicate at temperatures below 100° F., and
   (b) heating the thus coated granules to a temperature sufficient to release the encapsulated barium fluosilicate, thereby allowing the released barium fluosilicate to react with and insolubilize said silicate.

9. As an article of manufacture, particles of barium fluosilicate having deposited on their surface an alkali-resistant coating comprising a thermoplastic resin.

References Cited

UNITED STATES PATENTS

| | | | |
|---|---|---|---|
| 1,973,731 | 9/1934 | Snell | 106—84 |
| 1,973,732 | 9/1934 | Snell | 106—84 |
| 1,991,981 | 2/1935 | Hillers | 117—27 |
| 2,378,927 | 6/1945 | Jewett | 106—74 |
| 2,379,358 | 6/1945 | Jewett | 117—27 |
| 2,981,636 | 4/1961 | Lodge et al. | 117—100 X |
| 3,390,723 | 7/1968 | Hower et al. | 106—80 |

OTHER REFERENCES

"NCR" Capsules Have Wide Possibilities, The NCR Factory News, October 1959, 4 pages.

MURRAY KATZ, Primary Examiner

D. C. KONOPACKI, Assistant Examiner

U.S. Cl. X.R.

106—83, 84; 117—27, 100 B